W. B. KEIGHLEY.
BURNISHING MACHINE.
APPLICATION FILED MAY 10, 1910.
1,031,674.
Patented July 2, 1912.
3 SHEETS—SHEET 1.
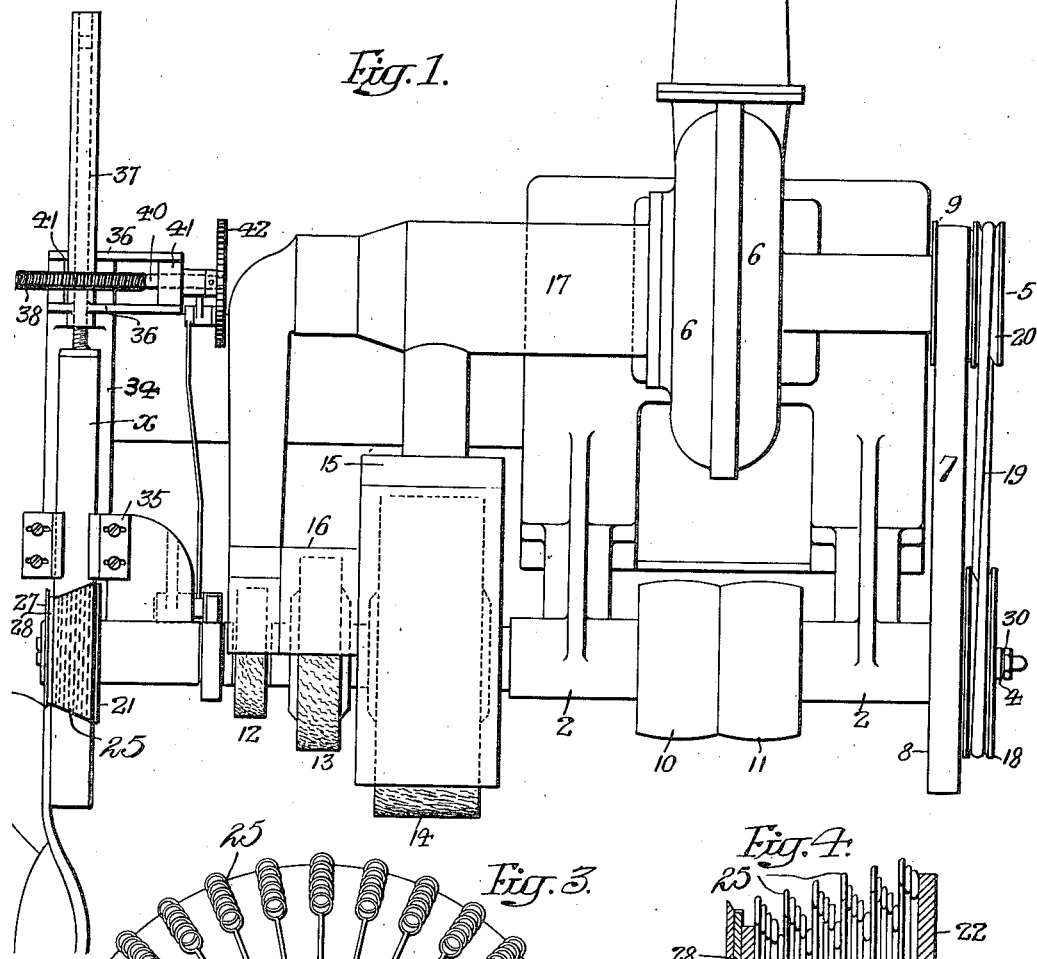
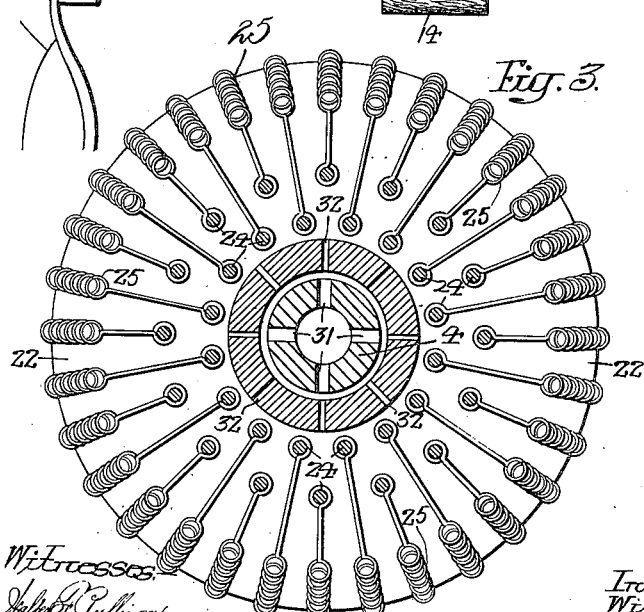
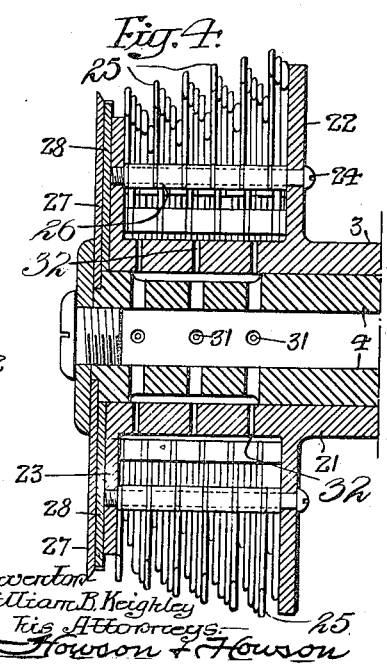
Witnesses:
Inventor
William B. Keighley
by his Attorneys
Howson & Howson

W. B. KEIGHLEY.
BURNISHING MACHINE.
APPLICATION FILED MAY 10, 1910.

1,031,674.

Patented July 2, 1912.
3 SHEETS—SHEET 2.

Witnesses

Inventor—
William B. Keighley.
by his Attorneys,
Howson & Howson

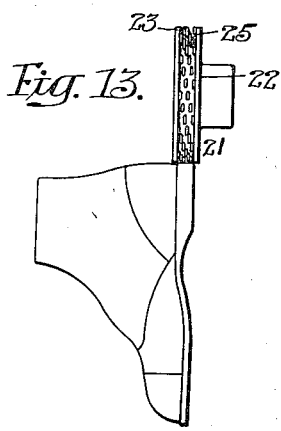
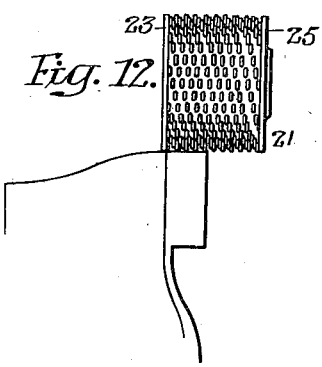
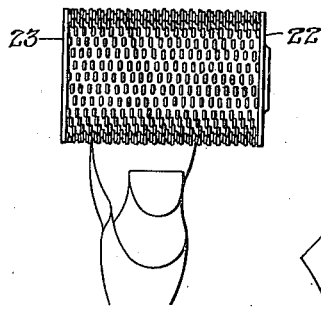
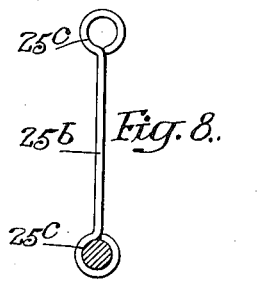
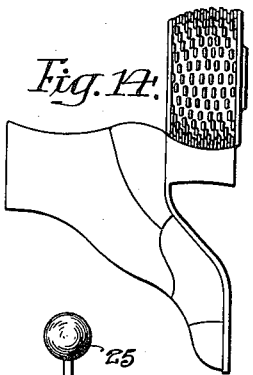
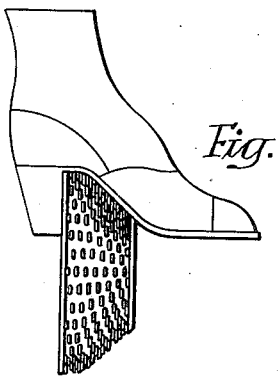
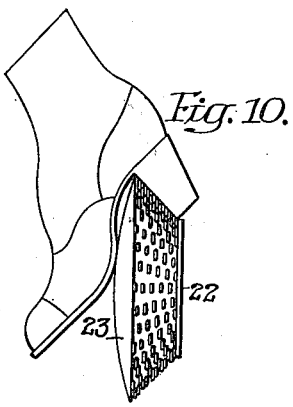
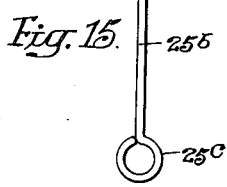

UNITED STATES PATENT OFFICE.

WILLIAM BOTTOMLEY KEIGHLEY, OF VINELAND, NEW JERSEY.

BURNISHING-MACHINE.

1,031,674.

Specification of Letters Patent. Patented July 2, 1912.

Application filed May 10, 1910. Serial No. 560,517.

*To all whom it may concern:*

Be it known that I, WILLIAM B. KEIGHLEY, a citizen of the United States, residing in Vineland, Cumberland county, State of New Jersey, have invented certain Improvements in Burnishing-Machines, of which the following is a specification.

One object of my invention is to provide a machine of novel construction particularly designed for burnishing or polishing the heels and other portions of shoes, as well as otherwise finishing them in order to give them the ornamental appearance desired.

The parts usually burnished are known technically as the heel, the top piece, the heel breast, the shank, the fore part, and the edge, and it is these portions upon which my machine is particularly designed to act.

I further desire to provide a machine of the character noted with means for automatically feeding wax to the burnishing tool, and so design this latter that it is capable of operating to finish the rand, as well as to indent the portion adjacent said rand.

Another object of the invention is to provide a polishing or burnishing tool particularly adapted to rapidly produce a high finish on the heel or other part of a shoe and that without possibility of injury to the parts acted on.

The invention also contemplates a novel arrangement and construction of rand and indenting wheels, preferably though not necessarily, designed to coöperate with the burnishing tool in acting upon a heel to be burnished.

These objects and other advantageous ends I secure as hereinafter set forth, reference being had to the accompanying drawings, in which;—

Figure 2:
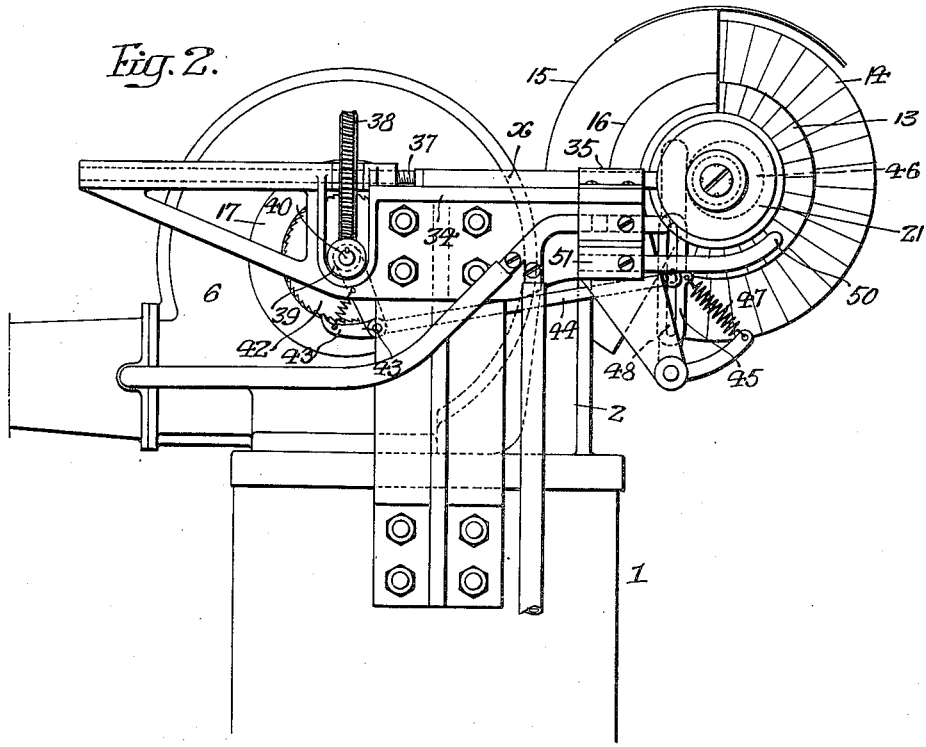
Figure 5:
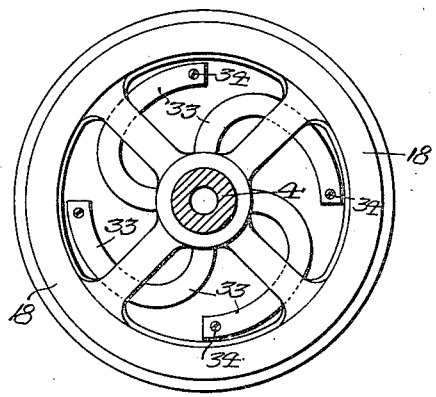
Figure 6:
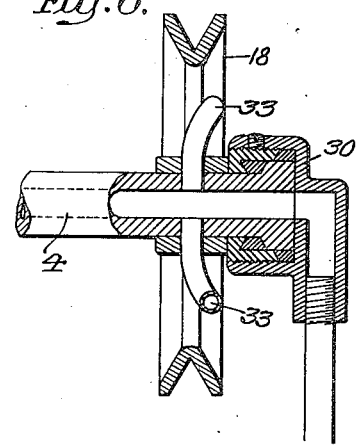

Figure 1, is a plan of a machine constructed according to my invention; Fig. 2, is an end elevation of the machine shown in Fig. 1; Figs. 3 and 4 are vertical sections at right angles to each other showing the construction of the burnishing tool; Figs. 5 and 6 are respectively an end elevation and a vertical section of the pulley wheel showing the means for supplying air for admixture with the fuel for heating the burnishing tool; Fig. 7 is a side elevation of a modified form of one of the elements of which the burnishing tool may be made; Fig. 8 is a side elevation of the preferred form of tool element; Figs. 9 to 14 inclusive are elevations illustrating different forms of burnishing tools and showing their mode of operation upon the various parts of shoes and Fig. 15 is a side elevation of another form of tool element.

In the above drawings, 1 represents the supporting frame of the machine on which are mounted bearings 2 carrying a plurality of concentric shafts 3 and 4, and parallel with these shafts is a second or counter shaft 5 extending through the casing 6 of an exhauster driven through a belt 7 transmitting power between a pulley 8 on the shaft 3 and a second pulley 9 on said shaft 5. Said shaft 3 is provided with fast and loose pulleys 10 and 11, of which the first may be driven from any suitable source of power and also has fixed to it a series of brushes 12, 13, and 14 provided with hoods 15 and 16 connected to the inlet 17 of the exhauster 6, preferably in the manner disclosed and claimed in my pending application for Patent No. 544,604, filed March 1, 1910.

The inner shaft 4 has fixed to one end a pulley 18 connected through a twisted belt 19 with a pulley 20 on the shaft 5, so that this inner shaft, under operating conditions, is turned in a direction opposite to that of the shaft 3.

One of the vital features of my present invention consists in a burnishing wheel 21 which is mounted on the shafts 3 and 4 on the end opposite that having the pulley 18. This burnishing wheel, shown best in Figs. 3 and 4, consists of two flanges 22 and 23, preferably though not necessarily formed integral with the shaft 3 and having extended between them, two or more series of bolts or rods 24 preferably staggered and so arranged that the bolts of each series are at the same distance from the center of the shaft. On each of said bolts is mounted a series of burnishing elements 25, which in the case shown in Figs. 3 and 4, are spaced at definite distances apart by sleeves 26 on the bolts 24.

It will be understood that the burnishing elements may be made in any of a number of different forms, and while those shown in Figs. 3 and 4 consist of wires of various lengths each of the construction shown in Fig. 8, they may be made of the constructions shown in Figs. 7 and 15. Those shown in Fig. 8 are formed of a piece of wire 25$^b$ having an eye 25$^c$ on each end while those shown in Fig. 7 consist of flat blades 25$^a$ of substantially uniform thickness but of increasing width from one end to the other. The elements shown in Fig. 15 consist of a piece of wire 25^b having an eye 25^c at one end and a ball 25 at the other. In any case the various burnishing elements are staggered both transversely of the burnishing tool as well as longitudinally, so that they engage any surface which may be presented to them at a number of different points and do not produce a wavy appearance, as would be the case if the various sets struck in the same lines.

It will be understood that the lengths of the various burnishing members may be varied in any desired manner to produce different contours of burnishing tools adapted to operate on the different parts of a shoe, and in Figs. 9 to 14 inclusive I have illustrated this feature, as well as some of the various forms in which the tool may be made and used. In order to secure the highest efficiency for my machine, I combine with the burnishing tool a device for finishing the rand of the heel as well as for indenting the heel edge adjacent said rand, and for this purpose I fix to the shaft 4 adjacent what is, in the case illustrated, the smaller end of the burnishing tool, a rand wheel 27; placing between this wheel and the end plate 23 of the tool, an indenting wheel 28 which is loose between said two plates so as to be free to turn independently of them.

Under operating conditions the application of power to the fast pulley 10 turns the burnishing tool 21 through the shaft 3, and if any of the various portions of the shoe be presented to said tool, the burnishing elements so act on its surfaces as to give it a perfectly smooth surface and a high permanent polish; it being understood that the coloring and other material may be applied to the shoe operated on previous to its presentation to the burnishing tool, as will be understood by those skilled in the art.

In order to secure the best effects, it is advisable that the tool be heated while it is in use and for this purpose I make the shaft 4 hollow and connect it through a swivel joint 30 with a source of fuel supply. The opposite end of said shaft within the burnishing tool 21 is provided with radial openings 31 and the adjacent end of the shaft 3 has corresponding openings 32 through which the fuel may escape into the body of the tool so as to be capable of heating the same under conditions of use.

For the purpose of supplying air to the gas in the shaft 4 so that the device may act as a Bunsen burner, I provide the pulley wheel 18 with a series of goose neck pipes 33 which as shown in Figs. 5 and 6, communicate through suitable openings with the interior of the shaft 4. With this arrangement the turning of the pulley wheel causes air to be drawn or forced into the shaft through the goose necks 33, which are preferably provided with adjusting screws 34 whereby the flow of air through them may be varied as desired.

When the heel of a shoe is applied to the burnishing tool of the construction shown in Fig. 4, the rand wheel 27 engages and finishes the rand thereof, while the indenting wheel 28 acts on the edge of said heel immediately adjacent the rand to form the ornamental indentations desired.

From the arrangement of parts described and shown it is obvious that the rand wheel 27 is turned in the direction opposite that in which the various burnishing elements are turned, while the indenting wheel is independent of both of these parts, so that as the shoe is swung back and forth in the act of burnishing the heel, the teeth of the indenting wheel repeatedly engage the same portions of said heel and form indentations of the desired depth.

During the finishing operation it is necessary that wax be supplied to the burnishing tool and for the purpose of accomplishing this end, I mount on a suitable portion of the frame 1, a bracket 34 having a guideway 35 for the stick of wax X whereby its end immediately adjacent the burnishing wheel is steadied and properly directed.

From Fig. 1, it will be seen that the bracket 34 projects rearwardly from said wheel and guideway and has at about its middle point, two forked or yoke shaped guides 36, spaced apart and designed to receive a screw 37 for forcing the stick of wax X toward the burnishing wheel. This screw has mounted on it between the two abutments 36, a worm wheel 38, with which engages a worm 39 carried on a spindle 40 supported in suitable bearings 41. Fixed to this latter spindle is a ratchet wheel 42 having a pawl 43 carried on a swinging arm and connected through a link 44 with a lever 45 fulcrumed on a suitable portion of the supporting frame. The shaft 3 has fixed to it a cam 46 and a spring 47 holds the lever 45 in engagement with said cam so that revolution of the shaft causes an oscillation of the lever. The link 44 may be adjusted as to the length of its stroke, since, as shown in Fig. 2, the lever 45 has an elongated slot 48, in any portion of which the end of said link may be fixed. With this arrangement of parts, the revolution of the shaft 3 causes an intermittent turning of the ratchet 42 through the agency of the link 44 and pawl 43 so that there is a corresponding movement of the worm 39 and of the worm wheel 38. Since the screw 37 is threaded through the hub of said worm wheel, it is also turned at a relatively slow rate in such manner as to feed the stick of wax X toward the burnishing elements of the burnishing tool 21. This latter is thus supplied with wax necessary for the polishing or finishing operation and by means of the gas flames it is kept in a suitably heated condition.

If desired, or found advisable, the burnishing tool may be still further heated under operating conditions by any suitable means and there is also provided a supporting bracket 50 adjacent the front of the tool for supporting the shoe while it is being operated on. Said bracket is so mounted as to be adjustable to suit it to properly support shoes of different styles; being slidably mounted on a block 51 and if desired otherwise adjustably supported to attain the desired object.

While the supporting bracket itself may be of any desired form, it is preferably made of a stiff or rigid rod whose body is curved parallel with the surface of the burnishing tool.

It will be noted that the various burnishing elements under operating conditions are maintained in their radial positions under the action of centrifugal force and act on the body to be polished by delivering to the same a series of light, glancing blows.

Since each one of the tools has a relatively large number of burnishing elements and since under operating conditions the shaft carrying them is turned at a high speed, their extremities together form a polishing or burnishing surface.

I claim:—

1. A burnishing machine consisting of a shaft; a plurality of sets of pivotally mounted burnishing elements carried by said shaft to form a polishing or burnishing tool; each of said elements consisting of a straight rod having an enlarged head and free to assume a position radial to the shaft under the action of centrifugal force.

2. The combination of a supporting shaft having a burnishing tool consisting of end plates having pivot rods extending between them substantially parallel to the shaft; with a series of independently movable rods carried by each of said pivot rods and having enlarged heads.

3. The combination of a shaft with a burnishing tool thereon consisting of a plurality of closely associated headed rods pivotally mounted to be free to assume radial positions under the action of centrifugal force, and capable of swinging independently of each other.

4. The combination of a shaft; with a burnishing tool mounted thereon; said tool consisting of a plurality of independent pivotally mounted radially extending flexible rods having headed outer extremities formed to serve as polishing means.

5. The combination of a shaft; a burnishing tool mounted thereon; an indenting wheel mounted immediately adjacent one side of said tool; and a rand wheel adjacent said indenting wheel; with means for turning the rand wheel and the burnishing tool independently of each other.

6. The combination of a shaft; a burnishing tool mounted thereon; an indenting wheel mounted immediately adjacent one side of said tool; and a rand wheel adjacent said indenting wheel; with means for turning the rand wheel and the burnishing tool independently of each other, in opposite directions.

7. The combination with a shaft of a burnishing tool mounted thereon; a rand wheel; means for turning said lip wheel and the burnishing tool in opposite directions; and an indenting wheel mounted between said rand wheel and the burnishing tool; said indenting wheel being free to turn independently of the other parts of the device.

8. The combination in a burnishing machine of a shaft; a burnishing tool mounted thereon; a structure adjacent said burnishing wheel for supporting a body of wax; a wax feeding member; and means for actuating said member from the shaft to cause the body of wax to be moved toward the burnishing wheel.

9. The combination in a burnishing machine of a shaft; a burnishing wheel attached thereto; a guideway projecting adjacent said burnishing wheel; a pusher for forcing a stick of wax through said guideway toward the burnishing wheel; gearing for actuating said pusher; and means connected with the shaft for actuating said gearing.

10. The combination in a burnishing machine of a supporting structure; two concentric shafts mounted thereon; means for turning said shafts in opposite directions; a burnishing wheel mounted on one shaft; and a rand wheel mounted on the other shaft immediately adjacent the burnishing wheel in position to operate on an object outside the planes of operation of said latter wheel.

11. The combination in a burnishing machine of a supporting structure; two concentric shafts mounted thereon; means for turning said shafts in opposite directions; a burnishing wheel mounted on one shaft; a rand wheel mounted on the other shaft immediately adjacent the burnishing wheel; with an indenting wheel loosely mounted between the burnishing tool and the rand wheel.

12. The combination in a burnishing machine of a hollow rotary shaft connected to a source of fuel supply; a hollow burnishing tool mounted on the shaft and constructed to receive fuel from the interior thereof; with a device for forcing air into the shaft for mixture with the fuel.

13. The combination in a burnishing machine of a hollow rotary shaft connected to a source of fuel supply; a hollow burnishing tool mounted on the shaft and constructed to receive fuel from the interior thereof; with a curved pipe connected to the shaft and arranged to lie in a plane radial thereto; one end of said pipe being open to the atmosphere so as to force air into said shaft when it is turned.

14. The combination in a burnishing machine of a hollow rotary shaft connected to a source of fuel supply; a hollow burnishing tool mounted on the shaft and constructed to receive fuel from the interior thereof; with a series of curved pipes connected to the shaft and lying in a plane radial thereto; the outer ends of the pipes being open to the atmosphere.

In testimony whereof, I have signed my name to this specification, in the presence of two subscribing witnesses.

WILLIAM BOTTOMLEY KEIGHLEY.

Witnesses:
F. M. LYANS,
A. G. MAVELLI.